United States Patent [19]

Kusay

[11] Patent Number: 5,658,369
[45] Date of Patent: Aug. 19, 1997

[54] RECOVERY OF SUBSTANCES FROM EXHAUST STREAMS

[75] Inventor: Roland Gregor Paul Kusay, Surrey, United Kingdom

[73] Assignee: The BOC Group plc, Surrey, England

[21] Appl. No.: 491,428

[22] Filed: Jun. 16, 1995

[30] Foreign Application Priority Data

Jun. 20, 1994 [GB] United Kingdom ............... 9412310

[51] Int. Cl.⁶ .................................. B01D 53/047
[52] U.S. Cl. ............... 95/41; 95/96; 95/106; 95/115; 95/143; 95/146
[58] Field of Search ............... 95/39, 41, 101, 95/102, 106, 114, 115, 141, 143, 146; 96/143, 144

[56] References Cited

U.S. PATENT DOCUMENTS

| | | | |
|---|---|---|---|
| 1,934,075 | 11/1933 | Lewis | 95/143 X |
| 2,747,681 | 5/1956 | Schuftan et al. | 96/122 |
| 3,313,092 | 4/1967 | Potts | 96/143 X |
| 3,568,406 | 3/1971 | Dynes | 95/115 |
| 4,056,369 | 11/1977 | Quackenbush | 95/115 X |
| 4,104,039 | 8/1978 | Kuri et al. | 95/141 X |
| 4,283,212 | 8/1981 | Graham et al. | 95/115 X |
| 4,305,734 | 12/1981 | McGill | 95/102 |
| 4,331,456 | 5/1982 | Schwartz et al. | 95/101 X |
| 4,338,101 | 7/1982 | Tuttle | 95/146 X |
| 4,343,629 | 8/1982 | Dinsmore et al. | 95/106 X |
| 4,421,532 | 12/1983 | Sacchetti et al. | 95/106 X |
| 4,534,346 | 8/1985 | Schlaechter | 95/102 X |
| 4,696,681 | 9/1987 | Lloyd-Williams | 95/115 |
| 4,892,565 | 1/1990 | Schmidt et al. | 95/143 X |
| 4,892,566 | 1/1990 | Bansal et al. | 96/143 X |
| 5,125,935 | 6/1992 | Nakaya et al. | 95/143 X |
| 5,152,812 | 10/1992 | Kovach | 95/41 |
| 5,415,682 | 5/1995 | Zarchy et al. | 95/101 |

FOREIGN PATENT DOCUMENTS

| | | | |
|---|---|---|---|
| 1144873 | 4/1919 | Canada . | |
| 0018478 | 11/1980 | European Pat. Off. . | |
| 3810705 | 10/1989 | Germany . | |
| 3933111 | 4/1991 | Germany | 95/106 |

*Primary Examiner*—Robert Spitzer
*Attorney, Agent, or Firm*—David M. Rosenblum; Salvatore P. Pace

[57] ABSTRACT

A method for the collection and subsequent regeneration of substances exhausted through a vacuum pump. In a first phase, an exhaust stream from the pump to an adsorption bed in which one or more components of the stream are adsorbed. In a second phase, adsorbed component(s) are regenerated from the bed by connecting the bed to the inlet side of the vacuum pump.

3 Claims, 1 Drawing Sheet

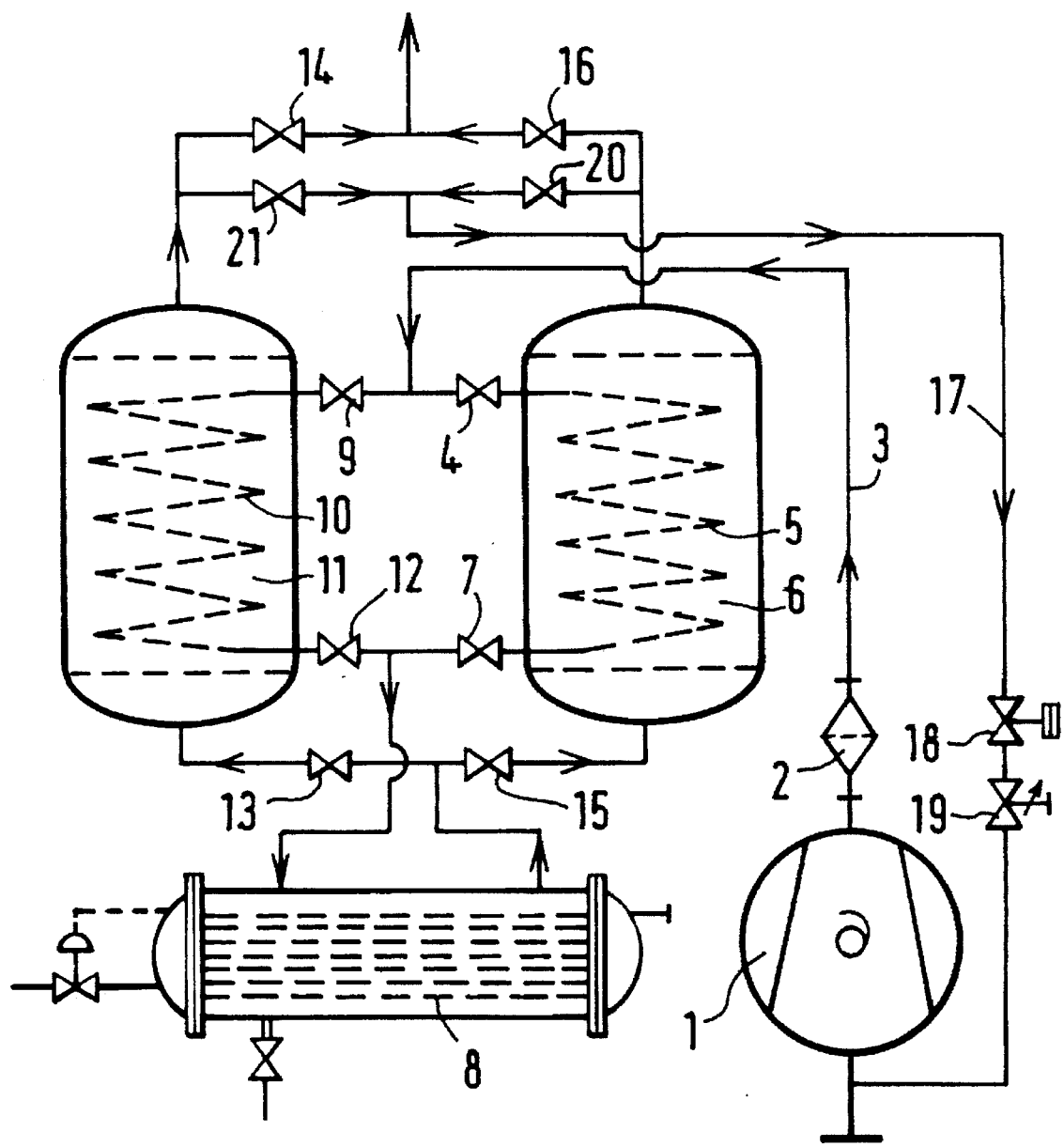

5,658,369

RECOVERY OF SUBSTANCES FROM EXHAUST STREAMS

BACKGROUND OF THE INVENTION

This invention relates to a method and apparatus for the collection and subsequent regeneration and recovery of substances exhausted through a vacuum pump and, more particularly, of condensible substances including solvents.

Numerous processes are known requiring the evacuation or extraction of a variety of chemical compounds, many of which are volatile, by vacuum pump means and which require to be collected and recovered for economic or environmental reasons.

It is, for example, known to pass exhaust stream from a vacuum pump to pressure swing adsorption (PSA) apparatus in which one or more beds of activated carbon, molecular sieve material or zeolite material adsorbs one or more components of the exhaust stream including solvents and a variety of volatile organic compounds.

Regeneration of the adsorption beds can generally be accomplished, especially in the case of solvents, by
i) heating the bed with nitrogen gas so that the desorbed solvent is, at reduced pressure, entrained in the nitrogen stream and thereafter passing the stream through a liquid nitrogen condenser to remove the solvent and feeding the nitrogen back into the bed following reheating; or
ii) heating the bed directly by, for example, embedded heating coils, indirect heating means or heat transfer coils and subjecting the bed to vacuum, whereby desorbed solvent can be pumped away and condensed.

There are, however, difficulties in connection with the known methods described above. In particular, it is clear that liquid nitrogen and/or an additional vacuum pump has to be provided; even then the additional pump may itself produce an emission of exhaust stream components which may themselves have to be scrubbed. In addition, for adsorbent heating during regeneration, some additional energy source has to be provided. In all such cases additional capital costs and/or operating costs are therefore required.

The present invention is, however, concerned with the provision of an improved collection/recovery method in which no liquid or gaseous nitrogen is required and no additional vacuum pump, additional heating means or other energy source is required.

SUMMARY OF THE INVENTION

In accordance with the invention, there is provided a method for the collection and subsequent regeneration of substances exhausted through a vacuum pump, which comprises, in a first phase, passing an exhaust system from the pump to an adsorption bed in which one or more components of the stream are adsorbed and, in a second phase, regenerating adsorbed component(s) from the bed by connecting the bed to the inlet side of the vacuum pump.

Preferably the exhaust stream is first passed through a heat exchange system located within or adjacent to the adsorption bed; in this way solvent laden exhaust stream in particular may partially condense in the heat exchange system, for example a coil or other passageway through which the stream flows, and give up its heat of condensation together with some "super heat" emanating from its compression in the vacuum pump.

Also preferably, the exhaust stream if first passed through a condenser for the recovery of condensible exhaust stream components.

In the condenser, the bulk of the remaining vapors will be condensed. The condenser can usually be supply water, cooled but may, if necessary or appropriate, be refrigerated.

Even with refrigeration of the condenser, this may not be sufficient, required maximum emission limit may be exceeded and it is for this reason that the method of the invention utilizing an adsorption bed is important.

In preferred embodiments of the invention, therefore, the exhaust stream is sequentially passed through the heat exchange system and subsequently through the condenser prior to entering the adsorption bed.

With regard to the adsorption beds, it is very preferable for two adsorption beds to be provided in parallel. Preferably also, both such beds have heat exchange means located within or adjacent thereto. Ideally, in the first phase, a first adsorption bed is adapted for adsorption and the second adsorption bed is adapted for regeneration and, in the second phase, a first adsorption bed is adapted for regeneration and the second adsorption bed is adapted for adsorption.

BRIEF DESCRIPTION OF THE DRAWINGS

For a better understanding of the invention, reference will now be made, by way of exemplification only, to the accompanying drawing which shows apparatus for use for carrying out the method of the invention.

DETAILED DESCRIPTION

With reference to the drawing, there is shown apparatus which comprises a vacuum pump 1 where exhaust is limited to a flame arrestor 2 and thence via a pipeline 3
via a valve 4 to a first heat exchange coil 5 contained with a first adsorbent bed 6 and thence via a valve 7 to a condenser 8, or
via a valve 9 to a second heat exchange coil 10 contained within a second adsorbent bed 11 and thence via a valve 12 to the condenser 8.

The exhaust stream from the pump 1 minus the condenser vapors exits the condenser 8 and passes
via a valve 13 to the adsorbent bed 11 and thence (minus adsorbed components) to the atmosphere via a valve 14, or
via a valve 15 to the adsorbent bed 6 and thence (minus adsorbed components) to the atmosphere via a valve 16.

A regeneration line 17 is provided and equipped with an isolation valve 18 and a throttle control device 19. The bed 6 is linked to the line 17 via a valve 20 and the bed 11 is linked to the line 17 via a valve 21.

In use of the apparatus shown in the drawing:
i) with valves 4, 7, 13 and 14 open and the remainder closed (other than those described below with the simultaneous regeneration described below) in a first mode of operation, exhaust gases in a stream leaving the vacuum pump 1 pass along the pipeline 3 and via the valve 4 to the heat exchange coil 5 where any condensation and/or super-heat causes heat transfer to the adsorbent of the bed 6. The stream then passes to the condenser 8 via the valve 7 where the temperature of the condenser effects a major condensation of solvents or other volatile components present in the stream.

The residual stream then passes via the valve 13 to the adsorbent bed 11 containing an adsorbent suitable for the adsorption of stream components. The remaining stream then exits the bed and is vented to atmosphere via the valve 14.

Simultaneously in this first mode, the adsorbent bed 6 is regenerated by opening the valves 20 and 18 and allowing the inlet pressure of the pump 1 to cause regeneration to occur with desorbed components being recirculated through the apparatus.

ii) with valves 9, 12, 15 and 16 open and the remainder closed (other than those associated with the simultaneous regeneration described below) in a second mode of operation, exhaust gases in the stream leaving the vacuum pump 1 pass along the pipeline 3 and via the valve 9 to be heat exchange coil 10 where any condensation causes heat transfer to be adsorbent of the bed 11. The stream then passes to the condenser 8 via the valve 12 where the temperature of the condenser again effects a major condensation of solvent or other volatile components present in the stream. The residual stream then passes via the valve 15 to the adsorbent bed 6 containing the same adsorbent as that of the bed 11. The remaining stream then exits the bed and is vented to atmosphere via the valve 16.

Simultaneously in the second mode, the adsorbent bed 11 is regenerated by opening the valves 21 and (if necessary) 18 and again allowing the inlet pressure of a pump 1 to cause regeneration to occur with described components being recirculated through the apparatus.

A system is incorporated into the apparatus for continually switching from the first mode to the second mode with a frequency which will depend on the type and amount of substance being adsorbed in the respective beds and on the nature of the adsorbents in particular.

I claim:

1. A method for the collection and subsequent regeneration of substances exhausted through a vacuum pump, including:

subjecting a first adsorbent bed and a second adsorbent bed to a continuous cycle having, a first phase comprising passing an exhaust stream from the pump to the first adsorption bed and adsorbing at least one component of the exhaust stream within the first adsorption bed and regenerating said at least one component from the second adsorption bed by connecting the second adsorption bed to the inlet side of the vacuum pump and passing said exhaust stream in indirect heat exchange with adsorbent contained within the second adsorbent bed; and a second phase comprising regenerating said at least one component from the first adsorption bed by connecting the first adsorption bed to the inlet side of the vacuum pump and passing said exhaust stream from said pump in indirect heat exchange with the adsorbent contained within the first adsorbent bed and adsorbing the at least one component of the exhaust stream within the second adsorption bed by passing the exhaust stream to said second adsorption bed;

the at least one component being regenerated simultaneously with adsorption thereof so that said exhaust stream from the pump is continually formed in part by regenerating said at least one component.

2. The method according to claim 1 in which the exhaust stream is first passed through a condenser for the recovery of condensible exhaust stream components.

3. The method according to claim 2 in which the first phase further includes passing the exhaust stream into the condenser after having passed in indirect heat exchange with the adsorbent contained within the second adsorbent bed and prior to entering the first adsorbent bed and the second phase further includes passing the exhaust stream into the condenser after having pased in indirect heat exchange with the adsorbent contained within the first adsorbent bed and prior to entering the second adsorbent bed.

* * * * *